April 13, 1965   K. A. HONROTH   3,178,211

LEVER LOCK MECHANISM

Filed Aug. 5, 1963

INVENTOR.
KENNETH A. HONROTH
BY
ATTORNEYS

United States Patent Office 3,178,211
Patented Apr. 13, 1965

3,178,211
LEVER LOCK MECHANISM
Kenneth A. Honroth, Cleveland Heights, Ohio, assignor to Kendale Washer and Stamping Company, a corporation of Ohio
Filed Aug. 5, 1963, Ser. No. 299,724
6 Claims. (Cl. 292—256.69)

My invention relates to lever lock mechanisms for split clamping rings.

An object of my invention is an improved lever lock mechanism for split clamping rings, which mechanism combines in a novel manner the features of such a mechanism in which the detent element carried by the latch is positioned relatively close to the pivot of the latch for improving the leverage ratio when the latch is pivotally swung from its free end, in which the latch is not notched between the detent and free end which would otherwise weaken the latch, in which the lever is notched rather than the latch which is subject to a strain in the forcing of the latch to interlocked engagement with the lever, in which the tongue formed by notching of the lever is not overlapped by the latch in order to hold the lever in locked position but rather a portion of the main body unweakened by the notching, on the pivot side of the notch, is overlapped by the free end of the latch to firmly hold the lever in locked position.

Another object is the provision of an improved mechanism of the class described which is economical in construction, efficient in operation, and superior in results accomplished.

Another object is the provision if a lever lock mechanism having the parts so constructed and arranged as to provide for greater strength of the parts without increasing the weight or expense of the mechanism.

Another object is the provision for providing a more secure locking engagement between the lever and latch of such mechanism and which is readily operated with a minimum of effort to obtain locking engagement thereof.

Other objects and a fuller understanding of the invention may be had by referring to the following description and claims, taken in conjunction with the accompanying drawings, in which:

The lever lock mechanism embodying my invention is of the general class shown in United States Patents No. 2,579,975, No. 2,864,638 and No. 3,070,397, and constitutes an improvement upon the lever lock mechanisms shown in those patents and other like lever lock mechanisms.

Figure 1:
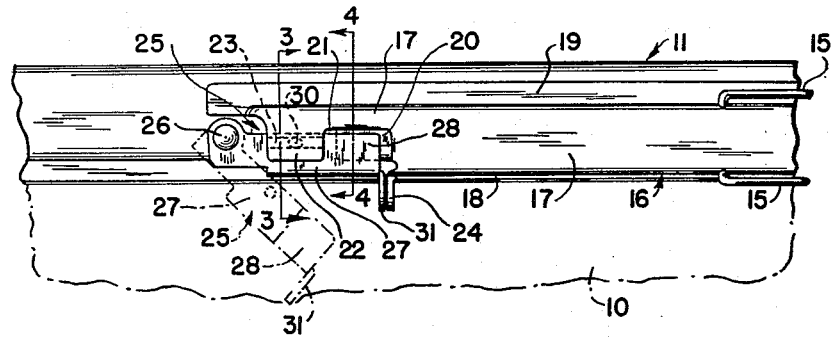
FIGURE 1 is an elevational view of a lever lock mechanism embodying my invention applied to split clamping ring, a portion of the clamping ring being shown in the drawings.
Figure 2:
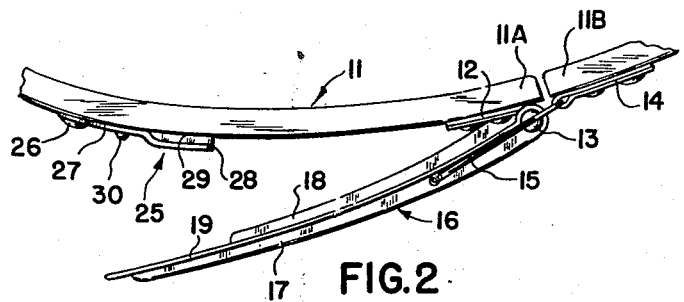
FIGURE 2 is a plan view looking down upon my improved lever lock mechanism with the lever member in an open position and the clamping ring in an unlocked condition.

Split clamping rings are used to clamp in position a cover or closure on the top of a drum or barrel, such as the drum, a portion of which is shown in FIGURE 1 and indicated by the reference character 10. The clamping ring is of general channel shape in cross-section and is split to have two closely spaced ends which may be brought close together by a suitable mechanism for holding the ends together and thus to clamp the ring around the closure and beaded end of a drum or barrel. The ring to which my mechanism is shown applied in the drawing has been designated by the reference character 11 having one free end designated as 11A and the other free end designated as 11B. Riveted to the ring 11 at its end 11A is a bracket 12. This bracket 12 carries a hinged pivot pin 13 to which the pivoted end of a lever, denoted by the reference character 16, is carried so as to permit the lever 16 to swing on an axis generally parallel to the axis of the ring 11.

A bracket 14 is riveted to the end 11B of the ring 11 as shown. A toggle link 15 has one end connected to the bracket 14 and the other end connected to the lever 16 at a distance from the pivot pin 13. The link 15 has parallel arms and ends which pivotally engage at one end with the bracket 14 and at the other end with suitable aligned openings in the lever 16. Thus, the toggle link 15 may swing in the usual manner as the lever 16 is swung on its pivot axis. The length of the link 15 is such that when the lever 16 is swung toward the axis of the ring 11 so as to be positioned next adjacent to the ring 11, then the ends 11A and 11B are drawn close together and the clamping ring 11 is held in a locked position so long as the lever 16 is held next adjacent to the ring 11.

The lever 16 has a central web portion 17 extending almost to its free end. The lever 16 also has an upper portion 19 extending to the free end of the lever. The web portion 17 is offset outwardly from the upper portion 19, the degree of this offset gradually decreasing toward the free end of the lever 16. Along the bottom edge of the lever 16 (as viewed in FIGURE 1) there is a lower flange portion 18 extending along a major portion of the lever 16 and adapted to engage under the lower leg of the U-shaped ring 11.

Near the free end of the web portion 17, the lever 16 is notched to form the vertically extending notch 21. Next adjacent the notch 21 and on the side thereof directed toward the pivot pin 13, the web portion 17 is depressed inwardly toward the axis of the ring 11 to form the depressed portion 20 offset from the remainder of the web portion 17.

Toward the free end of the lever 16, the notch 21 provides a tongue portion 22 projecting downwardly from the remainder of the lever. The tongue portion 22 is in the general plane of the major portion of the web portion 17. The upper portion 19 at the free end of the lever extends somewhat beyond the location of the tongue portion 22 as seen in the drawing. We thus have in the lever 16, the web portion 17 disposed in a general arcuate form in which the tongue portion 22 is in general alignment with the major portion of the web portion 17, whereas the depressed portion 20 is offset toward the axis of the ring 11 from the remaining portions of the web portion 17 and tongue portion 22.

On the inward side of the tongue portion 22, that is, on the side facing or directed toward the axis of the ring 11, there is a groove or dwell portion 23. This groove or dwell portion 23 extends across the tongue portion 22 but may be a more localized recess on the backward side of the tongue portion 22.

The lower flange portion 18 of the lever 16 has a portion bent downwardly to form the lug 24. This lug 24 has an opening therethrough suitable for a wire to pass therethrough.

A latch member denoted generally by the reference character 25 is pivotally secured to the ring 11 by a pivot pin 26. The latch member 25 is swingable on the axis of the pin 26 in an arc disposed in a plane substantially parallel to the axis of the ring 11. The latch member 25 has a body portion 27 next adjacent to the pivot pin 26. Offset from the plane of the body portion 27 is an offset portion 28. Along the bottom edge of the offset portion 28 there is a flange portion 29 extending therealong which is adapted to be positioned below the lower leg of the channel-shaped ring 11 upon the latch member 25 being swung upwardly alongside of the ring 11. Carried by and extending outwardly from the body portion 27 near the pivot pin 26 is a boss or projection 30 formed by moving outwardly metal of the latch member 25 at that location. As the boss 30 is adapted to interengage in the groove or dwell 23, it is referred to as a detent. The resiliency of the metal latch member 25 and the metal lever 16, and particularly of the tongue portion 22 thereof, is such that by a resilient snap action the detent or boss 30 may engage in the dwell or groove 23 when the latch member 25 is swung upwardly so as to move the body portion 27 under the tongue portion 22 and adjacent the ring 11, that is, to a position between the ring 11 and the tongue portion 22. Upon pivotally swinging the latch member 25 downwardly, such as to its position shown in broken lines in FIGURE 1, and by a similar snap action, the detent or boss 30 disengages from the groove or dwell 23 and thus removes the detent and dwell interengagement. At the free end of the latch member 25, the flange portion 29 thereof is bent downwardly to form the lug 31. This lug 31 also has an opening therethrough for accommodating a wire. When the latch is in its upper position and interlocked with the lever 16, the openings in the lugs 24 and 31 are in alignment and a wire, such as a wire attached to a seal, may extend through the aligned openings in the lugs 24 and 31.

When the lever and latch member are in the interlocked position, such as shown in full lines in FIGURE 1, the offset portion 28 at the free end of the latch member 25 is positioned over the depressed portion 20 and is located in the general plane of the tongue portion 22 and the remaining web portion 17 of the lever 16. The depressed portion 20 is disposed radially inward, that is, toward the axis of the ring 11, from the offset portion 28 of the latch member 25. At the same time as the offset portion 28 is disposed over the depressed portion 20, the body portion 27 of the latch member 25 is positioned in back of the tongue portion 22, that is, radially inward therefrom toward the axis of the ring 11. With the tongue portion 22 disposed over the body portion 27 of the latch member 25, the boss or dwell 30 is positioned in the detent or groove 23 on the inward side of the tongue 22.

As the boss or dwell 30 is located near the pivot 26 rather than near the free end of the latch member 25, an increased leverage of the latch member is obtained in swinging the latch member upwardly by seizing the free end thereof adjacent the lug 31. Were the dwell 30 located at the free end of the latch member 25, there would be little or no leverage obtained in forcing the latch member 25 upwardly against the resilient resistance encountered in obtaining snap action between the detent and dwell for a suitable detent and dwell interengagement.

It is to be noted that the latch member 25 is not notched and is thereby not weakened but is better able to withstand the strain of being moved upwardly against the resilient resistance offered by the parts in forcing interengagement of the dwell 30 and detent 23 and in forcing the offset portion 28 to slide over and overlap the depressed portion 20. The maximum strength of the latch member 25 is maintained by avoiding a notch therein as is found in some of the prior devices.

It is also to be noted that it is the offset portion 28 at the free end of the latch member 25 which overlaps the lever 16 on the side of the notch 21 toward the pivot 13. The lever 16 is relatively weak at the location of the tongue portion 22 and relatively strong on the side of the notch toward the pivot pin 13 and it is this stronger portion which takes the strain upon the latch member 25 interlocking with the lever 16 and holding it in position. The relatively weaker tongue portion 22 is disposed outwardly of the body portion 27 as illustrated, and the latch member 25 extends through the notch 21 to so position the free end of the latch member 25, that is, the offset portion 28, over the relatively stronger depressed portion 20 of the lever 16. This gives considerable advantage over the prior devices wherein it is the relatively weak tongue portion that is overlapped by the latch member rather than the main body of the lever on the side of the notch toward the pivot axis of the lever where the lever has not been weakened by an intervening notch.

Figures 3, 4, 5, 6:
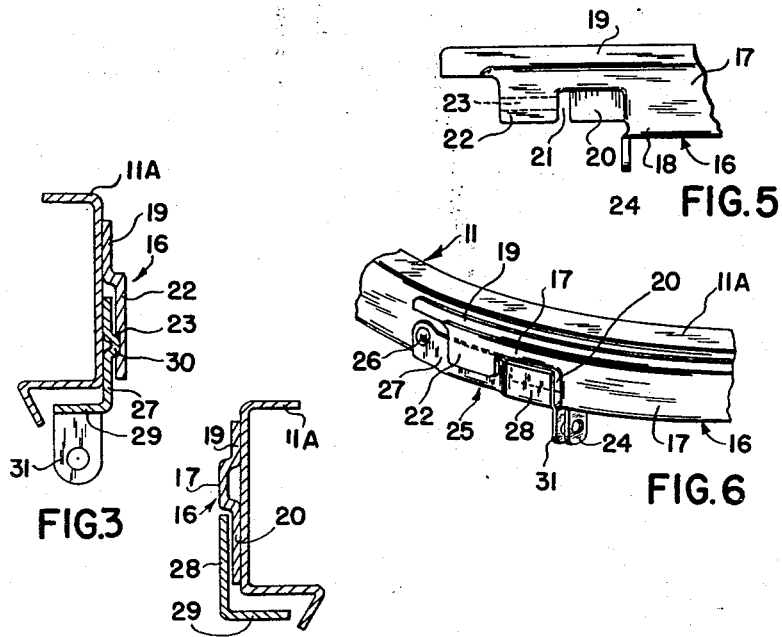
FIGURE 3 is an enlarged cross-sectional view looking through the line 3—3 of FIGURE 1.
FIGURE 4 is an enlarged sectional view looking through the line 4—4 of FIGURE 1.
FIGURE 5 is a detailed view of the free end of the lever of my mechanism.
FIGURE 6 is a perspective view of my lever lock mechanism applied to a split clamping ring, a portion of which is shown in the drawing.

My mechanism is operated in the usual manner of mechanisms of this general class. With the latch member 25 swung downwardly out of the way, the lever 16 may be swung inwardly to draw the ends 11A and 11B together and to dispose the lever 16 next adjacent the ring 11. This clamps the ring 11 tightly around the cover or closure and upper beaded end of the drum or container 10. The lever 16 is then locked in this position adjacent the ring 11 by swinging the latch member 25 upwardly on its pivot so as to position the body portion 27 back on the tongue portion 22 and to position the offset portion 28 overlapping the depressed portion 20 as illustrated in full lines in FIGURE 1 and in FIGURE 6.

By the mechanism shown, there is obtained the improved leverage in swinging the latch member upwardly to interlocked position; there is obtained a non-weakening of the latch member through notching or otherwise; there is obtained notching of the lever rather than the latch member and at a location which does not weaken the lever as it is overlapped at the location illustrated and described; and there is obtained a relationship providing maximum strength, ease of operation, and improved results following from the structure here described and shown.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a metal split clamping ring having a metal lever pivotally attached to said ring and movable in the general plane of said ring to expand and contract the ring and a metal latch member pivoted to said ring and movable in a plane generally normal to said ring plane, the lever and latch member having rearward sides, respectively, directed radially toward the axis of said ring and forward sides directly radially outward therefrom, the improvement comprising said lever having a notch extending from an edge thereof at a location spaced from the end thereof to leave a dependent tongue adjacent the end of the lever extending laterally of the longitudinal axis of the lever, said tongue having a dwell portion on the rearward side thereof, said lever having a first wall portion offset rearwardly from the plane of said tongue adjoining said notch, said latch member having a second wall portion adjacent the pivot thereof and a third wall portion offset forwardly from said second wall portion and adjacent the free end of the latch member, said latch member having a boss on the forward side of said second wall portion in position to engage by such action in the said dwell portion of the said tongue upon the second wall portion of the latch member being pivotally swung behind said tongue, the third wall portion of the latch member being aligned to be disposed on the forward side of said first wall portion of the lever upon the latch member being swung into said notch and said boss being engaged in said dwell portion.

2. In a metal split clamping ring having a metal lever pivotally attached to said ring and movable in the general plane of said ring to expand and contract the ring and a metal latch member pivoted to said ring and movable in a plane generally normal to said ring plane, the lever and latch member having rearward sides, respectively, directed radially toward the axis of said ring and forward sides directly radially outward therefrom, the improvement comprising said lever having a notch formed therein to provide a dependent tongue extending laterally of the longitudinal axis of the lever, said tongue having a dwell portion formed on the rearward side thereof, said latch member being disposed to extend through said notch upon being pivotally swung toward said lever positioned adjacent said ring, the latch member on the free end thereof extended through said notch being disposable on the forward side of said lever to hold the lever adjacent said ring, the latch member at a location spaced toward the pivot thereof from said free end being disposable on the rearward side of said tongue and there having a detent projection on the forward side thereof adapted to engage by snap action in said dwell portion of said tongue, the planes of said lever and latch member adjacent said notch being such that the free end of the latch member may be swung up to overlie the forward side of the lever adjoining said notch and thereby the latch member at said location spaced toward the pivot thereof is swung to underlie the rearward side of the tongue, the leverage obtained by pivotally swinging the free end of the latch member forcing the detent portion of the latch member by resilient snap action to engage the dwell portion of said tongue and positioning the said tongue to overlie the latch member at said location spaced toward the pivot thereof.

3. In a split locking ring structure, an improved lever and latch mechanism for securing the ring in position comprising the combination of a metal lever pivotally swingable in a plane substantially parallel to the plane of said ring and having a rearward side directed toward the axis of the ring and a forward side directed away from the axis of the ring, and a metal latch pivotally swingable in a plane substantially normal to the plane of said ring and having a rearward side directed toward the axis of the ring and a forward side directed away from the axis of the ring, the free end of the latch being disposable to overlap the lever at a first location spaced from the free end of the lever, the latch in an area spaced from the free end of the latch being disposable to underlie the lever at a second location spaced toward the free end thereof from said second location, said lever being provided with a slit extending from an edge thereof to permit the latch to extend from underlying the lever at said second location to overlap the lever at said first location without requirement for notching said latch to weaken the same, said latch at said area and the said lever at said second location having cooperative dwell and detent portions adapted to interengage by resilient snap action upon the free end of the latch being pivotally swung to press by leverage action the latch to overlap the lever at said first location and to underlie the lever at said second location.

4. Lever and latch mechanism as claimed in claim 3 and in which said cooperative dwell and detent portions comprise a boss projecting forwardly on said latch and a depression on the rearward side of the lever at said second location and positioned to accommodate said boss upon the said latch being moved under the lever at said second location and the resilient yielding of the lever at said second location to permit the said boss to be accommodated in said depression.

5. In a lever and latch mechanism for holding together the ends of a metal split ring adapted to be secured to a drum or the like and the cover therefor, the combination of a metal lever adapted to be pivotally linked to one end portion of the split ring to pivotally swing in a plane parallel to the plane of the ring toward the axis of the ring to a closed position adjacent said ring, a metal latch adapted to be pivotally mounted to the opposite end portion of the split ring to pivotally swing in a plane normal to the plane of the ring toward said plane of the ring to a closed position adjacent said ring, said lever having a notch therein extending laterally of the lever from an edge thereof to provide a dependent first portion extending laterally of the lever and adjacent the free end of the lever, said lever adjacent the notch on the side thereof toward the pivot of the lever being offset from the plane of said first portion toward the axis of the ring to provide an offset second portion, said latch having a first portion adjacent the pivot thereof disposed to be in substantially the plane of said second portion of the lever upon the lever and latch being in interengaged position adjacent said ring and in a plane parallel to the plane thereof, said latch having a second portion adjacent the free end thereof offset from the first portion of the latch, said second portion being disposed to be in substantially the plane of said first portion of the lever upon the lever and latch being in said interengaged position, said first portion of the lever being disposed outwardly of the first portion of the latch and said second portion of the lever being disposed inwardly of the second portion of the latch upon the lever and latch being in said interengaged position, said latch extending through said notch to enable the said second portion of the latch to be disposed outwardly of the said second portion of the lever, the respective first portions of the lever and latch on the opposed faces thereof having cooperative detent and dwell means formed therein to interengage by resilient snap action upon said first portion of the latch being pivotally swung to a position rearwardly of the first portion of the lever.

6. In a lever and latch mechanism as claimed in claim 5 and in which said cooperative detent and dwell means comprise a boss extending outwardly from said first portion of the latch on the side directed away from the axis of the ring, and a depression in the said first portion of the lever on the side directed toward the axis of the ring in a position to engage by resilient snap action the said boss.

References Cited in the file of this patent
UNITED STATES PATENTS

| | | |
|---|---|---|
| 2,579,975 | Scott et al. | Dec. 25, 1951 |
| 3,070,397 | Rodish | Dec. 25, 1962 |